Feb. 11, 1941.  H. L. GRAPP  2,231,445
HEATING DEVICE
Filed Oct. 23, 1939   2 Sheets-Sheet 1

Inventor
HERBERT L. GRAPP
By Chas. C. Reif.
Attorney

Feb. 11, 1941.   H. L. GRAPP   2,231,445
HEATING DEVICE
Filed Oct. 23, 1939   2 Sheets-Sheet 2
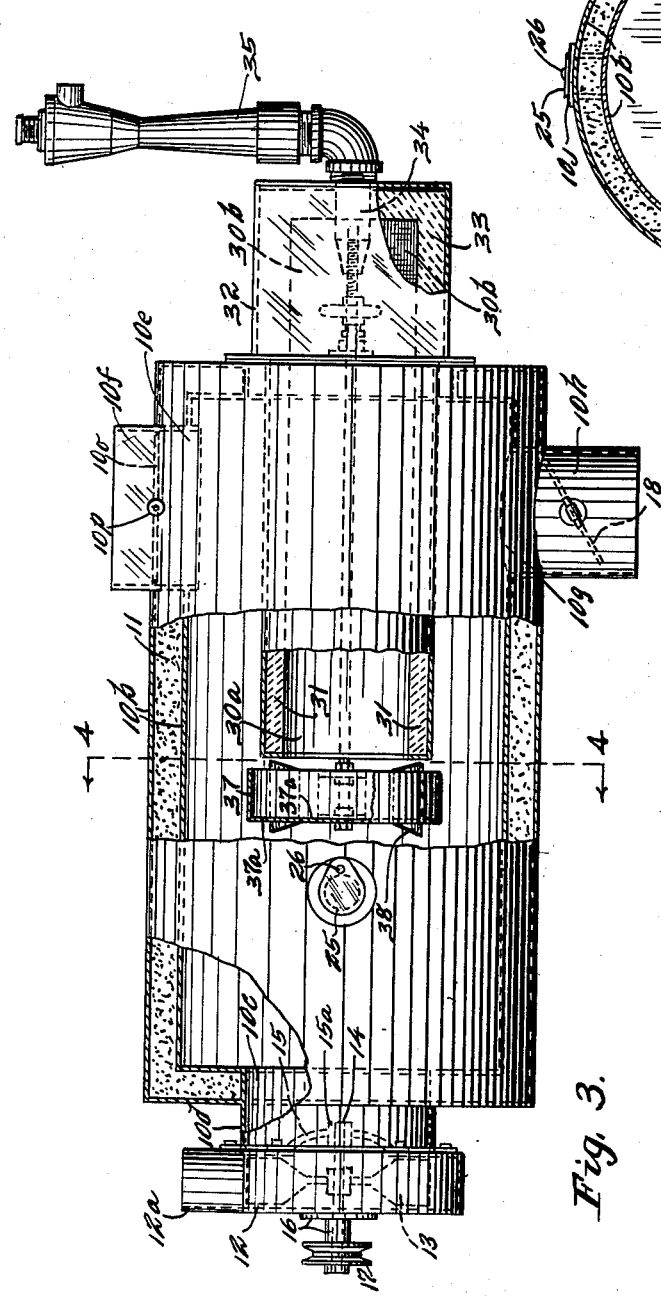
Inventor
HERBERT L. GRAPP Patented Feb. 11, 1941

2,231,445

UNITED STATES PATENT OFFICE 2,231,445

HEATING DEVICE

Herbert L. Grapp, Minneapolis, Minn.

Application October 23, 1939, Serial No. 300,767

7 Claims. (Cl. 263—19)

This invention relates to a heating device or furnace for heating air. The heated air is delivered to different places and devices for use, one common use being for drying ovens where various coated articles are dried.

In the type of device contemplated a heating chamber is provided within which is a combustion chamber extending from one end of said heating chamber. A fuel burner is disposed in said combustion chamber adjacent said end and the combustion chamber has an open end intermediate the ends of said heating chamber. Air is usually withdrawn by a fan at the opposite end of said heating chamber. It is necessary in the operation of the device to use fans of different capacity and to draw different volumes of air from the heating chamber at different times. Such action has affected the flame of the burner and the combustion in the combustion chamber. It has not been possible to get the uniform and desired temperatures in the combustion chamber.

It is an object of this invention therefore to provide means comprising a baffle cooperating with said combustion chamber and movable toward and from the same to control the combustion.

It is a further object of the invention to provide a cup-shaped baffle having its open end directed toward the open end of said combustion chamber and preferably being coaxial therewith, together with means for moving said baffle and holding it at different distances from said combustion chamber.

These and other objects and advantages of the invention will be fully set forth in the following description made in connection with the accompany drawings in which like reference characters refer to similar parts throughout the several views and in which:

Fig. 3 is a plan view of the device, certain parts being broken away and others shown in horizontal section; and Fig. 4 is a vertical section taken on line 4—4 of Fig. 1 as indicated by the arrows.

Figures 1, 2:
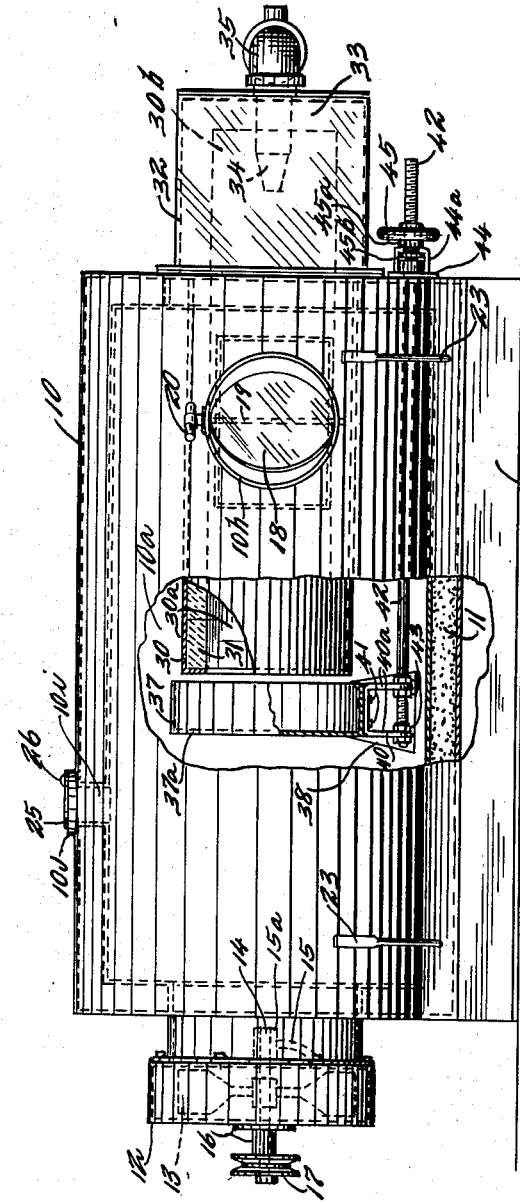
Fig. 1 is a view in side elevation of the device, some parts being broken away and others shown in vertical section.
Fig. 2 is a view in end elevation as seen from the right of Fig. 1, some parts being broken away and others shown in vertical section.

Referring to the drawings, a device is shown comprising a casing 10 having therein a chamber 10a which forms a heating chamber. While casing 10 might be of various forms, in the embodiment of the invention illustrated it is shown as of general cylindrical form. Casing 10 preferably has spaced walls 10b between which is placed some refractory material 11 such as heat resisting cement or fire brick. Casing 10 at one end has an opening 10c surrounded by a cylindrical wall 10d projecting some distance from the end of said casing and connecting with a fan or blower casing 12 having a discharge portion 12a. A fan 13 is illustrated as disposed in casing 12, being carried on a shaft 14 journaled in a bearing 15a of a spider bracket 15 secured to casing 12. Shaft 14 is also journaled in a bearing 16a of a flange bracket 16 secured to the outer side of casing 12. A pulley 17 is secured to shaft 14 and illustrated as of the groove type. Pulley 17 will receive a belt driven from a suitable motor or other means for driving fan 13. The discharge portion 12a of fan casing 12 will be connected by a suitable conduit to the place where the heated air is delivered. Casing 10 has an opening 10e at one side and adjacent one end surrounded by a wall 10f which projects somewhat from the side of said casing. A damper or valve 10o is disposed in casing 10f manipulatable by a handle 10p. Casing 10 also has an opening 10g at one side shown as opposite to opening 10e, which opening 10g is surrounded by a cylindrical casing 10h which projects some distance from the side of casing 10. A flat circular damper or valve 18 is disposed in casing 10h, the same being carried on a shaft or pin 19 journaled in the sides of casing 10h and which has a handle 20 secured thereto at the upper side of casing 10h. Casing 10 is illustrated as supported upon a frame 21 formed of a plate bent into semicircular shape at its top to receive and support casing 10, said plate having downwardly sloping portions connecting with vertical sides or portions 21a which are bent at their terminals to form supporting flanges 21b resting on the supporting surface. Portions 21a are connected by spaced braces 22 adjacent their ends. Rods 23 are disposed adjacent each end and at each side of casing 10 and have flattened ends secured to the outer side of said casing in any suitable manner, as by welding. These rods extend through the downwardly sloping portions of plate 21 and have threaded ends upon which are disposed the nuts 24 at the inner side of plate 21. Rods 23 thus form braces or tie rods for holding casing 10 firmly in place. Casing 10 is also provided with a comparatively small opening 10i at its top surrounded by a small cylindrical projection or hub 10j having an aperture therethrough. A cover plate 25 overlies said opening and is connected to hub 10j by a pivot member 26. Plate 25 can be swung about pivot 26 to expose opening 10i.

A combustion chamber 30a is provided disposed within heating chamber 10a and while this combustion chamber might be variously formed, in the embodiment of the invention illustrated it is shown as formed by a cylindrical casing 30 shown as lined with some refractory material 31, such as fire brick or heat resisting cement. Chamber 30a extends to one end of heating chamber 10a and through the end thereof and has an extension or continuation 30b outside of casing 10 which is surrounded by a casing 32 which is also lined with refractory material 33 such as fire brick or some heat resisting cement. A fuel burner such as a gas or oil burner 34 is disposed in the end 30b of the combustion chamber and fuel is supplied to said burner by the usual conduit shown as 35. It will be noted that chamber 30a has an open end disposed intermediate the ends of chamber 10a and substantially midway thereof. A baffle member 37 is provided and while this might be of various forms, in the embodiment of the invention illustrated it is shown as cylindrical having a closed end 37a and being open at the end opposite end 37a. Baffle 37 is thus of cup-shape with its open side directed toward the open end of chamber 30a and it is illustrated as substantially coaxial with casing 30. Baffle 37 is supported upon plates 38, having flanges extending along the outer side of said baffle and secured thereto by rivets 39. Plates 38 increase in width toward their bottom edges, which edges rest upon the inner side of inner casing 10b. A lug 40 is secured to the underside of baffle 37, centrally thereof, the same being of U-shape having downwardly extending arms 40a and having a central portion engaging the outer side of baffle 37 and secured thereto by rivets 41. The arms 40a are apertured to receive the threaded end of a rod 42. Nuts 43 are disposed on said threaded end, there being a nut at each side of each arm 40a. Rod 42 extends longitudinally of chamber 30a and extends through the end thereof and through a flanged bracket 44. Bracket 44 has outwardly projecting portions 44a oppositely disposed and having terminal projections extending toward each other. A hand wheel 45 is threaded on the outer end of rod 42 and provided with an annular groove 45a in the hub thereof, into which the terminal portions of members 44a extend. The hub of hand wheel 45 thus engages the outer sides of members or portions 44a and the portion 45b of the hand wheel hub disposed inwardly of the groove 45a engages the inner sides of said terminal parts of said portions 44a. Hand wheel 45 is thus supported for rotation in bracket 44 but cannot move longitudinally of rod 42. It will thus be seen that turning of hand wheel 45 will move rod 42 inwardly or outwardly.

In operation pulley 17 will be driven and fan 13 thus driven. Fuel will be supplied through the conduit 35 to the burner 34. The outer end of casing 32 may be provided with a plurality of holes (not shown) which may be regulated by a movable or rotatable plate to admit any desired amount of air about burner 34. With burner 34 operating the fuel, either gas or oil, is burned in combustion chamber 30a. This chamber and the walls thereof are raised to a very high temperature. Air will be drawn into heating chamber 10a through the openings 10e and 10g. Recirculated air is usually drawn in through opening 10e and through casing 10f and this can be regulated by the valve 10o. Fresh air is drawn in through opening 10g and casing 10h and this will be regulated by valve or damper 18. This air passes around the highly heated combustion chamber 5 and casing 30. The products of combustion issuing from combustion chamber 30a are prevented from being drawn directly out through the fan casing 12 by baffle 37. Baffle 37 causes a movement of the gases toward the end of the chamber opposite the fan and a good circulation of these hot products of combustion and the entering air is secured. The position of baffle 37 is varied in relation to combustion chamber 30a according to the volume of air being drawn through the heater and the desired temperature. It has been found that by positioning baffle 37 at a certain point for a certain volume of air the desired temperature can be nicely secured in the combustion chamber and the air can be heated to the desired point. The objectionable effect of the fan or blower on the combustion chamber and the flame therein has been entirely eliminated. Baffle 37 can be readily moved to the desired point by turning hand wheel 45 and it is securely held in the position to which it is moved. As stated baffle 37 makes it possible to get the desired temperature in combustion chamber 30a and makes it possible to bring casing 30 and its lining 31 up to a desired uniform temperature. The provision of the baffle has therefore added greatly to the success of the device and to the attainment of the desired results. It is, of course, necessary that the baffle 37 be movable so that it can be positioned at the desired point for the particular volume of air being handled and the temperature desired.

The device has been amply demonstrated in actual practice, found to be very successful and efficient and is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A heating device having in combination, a heating chamber, a casing having a combustion chamber therein disposed within and surrounded by said heating chamber, a fuel burner at one end of said combustion chamber, the opposite end of said casing and chamber being open, means for drawing air from said heating chamber and a baffle member extending across the open end of said casing and combustion chamber against which the products of combustion drawn from said combustion chamber engage and by which they are deflected and means for positioning said baffle at different distances from said open end of said combustion chamber.

2. A heating device having in combination, a heating chamber, a casing having a combustion chamber therein disposed within and surrounded by said heating chamber, a fuel burner at one end of said combustion chamber, the opposite end of said casing and chamber being open, means for drawing air from the end of said heating chamber adjacent the open end of said combustion chamber and a baffle member disposed between said means and said open end and extending transversely of said open end against which the products of combustion drawn from said combustion chamber engage and means for moving said baffle and positioning it at different distances from the open end of said combustion chamber.

3. A heating device having in combination, a heating chamber, a combustion chamber within said heating chamber extending from one end thereof, said combustion chamber having an open end disposed substantially midway between the ends of said heating chamber, means for withdrawing air from the other end of said heating chamber and a cup-shaped baffle having its open side directed toward the open end of said combustion chamber and means for moving said baffle bodily toward and from said open end and for holding it in different positions to control the movement of the products of combustion and the temperature of said combustion chamber.

4. A heating device having in combination, a heating chamber of general cylindrical form, a combustion chamber of general cylindrical form of much smaller diameter than said heating chamber extending from one end of said heating chamber and having an open end disposed intermediate the ends of said heating chamber, said combustion chamber being extended beyond said end of said heating chamber, a fuel burner disposed in said combustion chamber in said extended portion, means for withdrawing air from the opposite end of said heating chamber and a baffle member of cylindrical cup-shape coaxial with said combustion chamber having its open side directed toward the open end of said combustion chamber and means for moving said baffle toward and from said open end.

5. A heating device having in combination, a heating chamber, a combustion chamber extending from one end of said heating chamber within the same and of much smaller diameter than said heating chamber, said combustion chamber having an open end intermediate the ends of said heating chamber, means for withdrawing air from said heating chamber, a fuel burner disposed in said combustion chamber adjacent said first mentioned end of said heating chamber, a baffle spaced from and disposed in alinement with said open end of said combustion chamber, means supporting said baffle upon the wall of said heating chamber, a member secured to said baffle and extending to a point without said heating chamber and a member cooperating with said first mentioned member for moving said baffle toward or away from said open end of said combustion chamber.

6. A heating device having in combination, a heating chamber of general cylindrical form, a combustion chamber of general cylindrical form and of much smaller diameter than said heating chamber extending from one end of said heating chamber and having an open end disposed intermediate the ends of said heating chamber, a fuel burner disposed in said combustion chamber adjacent said first mentioned end of said heating chamber, means for withdrawing air from the opposite end of said heating chamber, a baffle of circular form spaced from and substantially coaxial with the open end of said combustion chamber, a bracket supporting said baffle and slidable upon the bottom of said heating chamber, a rod secured to said baffle and projecting at the front of said heating chamber and means cooperating with said rod to move said baffle toward or from the open end of said combustion chamber.

7. A heating device having in combination, a heating chamber closed at its end save for a combustion chamber extending into one end and an air outlet extending from its other end, means at the sides of said heat chamber for admitting air thereto, means for regulating the admission of said air, said combustion chamber being of cylindrical form and projecting into said heating chamber from one end to a point intermediate the ends thereof, said combustion chamber having an open inner end, a fuel burner adjacent the other end of said combustion chamber, a baffle member disposed in said heating chamber spaced from and centrally alined with the open end of said combustion chamber, means for positioning said baffle member at different distances from the open end of said combustion chamber and holding it in position, and means for withdrawing air through said air outlet.

HERBERT L. GRAPP.